(12) United States Patent
Ryu et al.

(10) Patent No.: US 7,670,722 B2
(45) Date of Patent: *Mar. 2, 2010

(54) CATHODE ACTIVE MATERIAL AND LITHIUM SECONDARY BATTERY CONTAINING THE SAME

(75) Inventors: Ji Heon Ryu, Seoul (KR); Min Su Kim, Daejeon (KR); Jung Eun Hyun, Seoul (KR); Jaepil Lee, Daejeon (KR); Eun Ju Lee, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 217 days.

This patent is subject to a terminal disclaimer.

(21) Appl. No.: 11/503,732

(22) Filed: Aug. 14, 2006

(65) Prior Publication Data

US 2007/0048597 A1      Mar. 1, 2007

(30) Foreign Application Priority Data

Aug. 16, 2005   (KR) .................... 10-2005-0074704

(51) Int. Cl.
*H01M 4/00*  (2006.01)
*H01M 4/50*  (2010.01)
*H01M 4/58*  (2010.01)

(52) U.S. Cl. .............. 429/223; 429/224; 429/231.3

(58) Field of Classification Search ............... 429/223, 429/224, 231.1, 231.3; 423/594, 594.6, 599
See application file for complete search history.

(56) References Cited

U.S. PATENT DOCUMENTS

| 2002/0164528 A1 * | 11/2002 | Sunagawa et al. | ........ 429/231.3 |
| 2003/0010631 A1 * | 1/2003 | Anzai | .................... 204/293 |
| 2006/0046143 A1 * | 3/2006 | Nakai et al. | ............. 429/231.1 |

FOREIGN PATENT DOCUMENTS

| EP | 1083615 A2 * | 3/2001 |
| JP | 2003092108 | 3/2003 |
| KR | 1020030096214 | 1/2003 |
| WO | WO2006/071972 A2 * | 7/2006 |

* cited by examiner

*Primary Examiner*—Patrick Ryan
*Assistant Examiner*—Muhammad Siddiquee
(74) *Attorney, Agent, or Firm*—Cantor Colburn LLP

(57) ABSTRACT

Provided is a non-aqueous electrolyte-based, high-power lithium secondary battery having a long service life and superior safety at both room temperature and high temperature, even after repeated high-current charging and discharging. The battery comprises a cathode active material composed of a mixture of lithium/manganese spinel oxide and lithium/nickel/cobalt/manganese composite oxide wherein at least one of two oxides has an average particle diameter of more than 15 μm.

10 Claims, No Drawings

CATHODE ACTIVE MATERIAL AND LITHIUM SECONDARY BATTERY CONTAINING THE SAME

FIELD OF THE INVENTION

The present invention relates to a high-power lithium secondary battery having a long-term service life and superior safety at both room temperature and high temperature, even after repeated high-current charge and discharge.

BACKGROUND OF THE INVENTION

Technological development and increased demand for mobile equipment have led to a rapid increase in the demand for secondary batteries as an energy source. In recent years, applicability of secondary batteries has been realized as power sources for electric vehicles (EVs) and hybrid electric vehicles (HEVs). In the light of such trends, a great deal of research and study has been focused on secondary batteries which are capable of meeting various demands. Among other things, there has been an increased demand for lithium secondary batteries having high-energy density, high-discharge voltage and power output stability.

Particularly, lithium secondary batteries for use in EVs and the like require not only high-energy density and capability to exert large power output within a short period of time, but also a long-term service life of more than 10 years even under severe conditions in which high-current charge/discharge cycles are repeated within a short time, thus necessitating remarkably superior safety and long-term service life compared to conventional small-size lithium secondary batteries.

Lithium ion batteries that have been used in conventional small-size batteries generally employ a layered structure of lithium cobalt composite oxide as a cathode material and a graphite-based material as an anode material. However, the main constitutional element of the lithium cobalt composite oxide, cobalt, is very expensive and is not suitable for use in electric vehicles due to safety concerns. Therefore, as the cathode material of lithium ion batteries for EVs, a lithium manganese composite oxide having a spinel structure made up of manganese is ideal in terms of both cost and safety.

However, the lithium manganese composite oxide, upon high-temperature and high-current charge/discharge, undergoes elution of manganese ions into an electrolyte due to the influence of the electrolyte, thus resulting in degradation of battery properties and performance. Thus, there is a need for measures to prevent such problems. In addition, the lithium manganese composite oxide has drawbacks such as a low capacity per unit weight, i.e., a low charge density, as compared to conventional lithium cobalt composite oxides or lithium nickel composite oxides. Thus, there is a limit to charge density of the battery and in order to enter practical use as the power source of EVs, designs of the battery to solve such disadvantages should be effected together.

In order to alleviate the above-mentioned respective disadvantages, various studies and attempts to fabricate electrodes using a mixed cathode active material have been made. For example, Korean Patent Laid-open Publication No. 2003-0096214 assigned to Matsushita Electric Industrial Co., Ltd. (Japan), and Japanese Patent Laid-open Publication No. 2003-092108 disclose techniques utilizing a mixture of lithium/manganese composite oxide, and lithium/nickel/cobalt/manganese composite oxide and/or lithium/nickel/manganese composite oxide to enhance recovery and power output characteristics. These arts, however, still suffer from problems associated with inferior life characteristics of the lithium manganese oxide and limited improvement of safety.

SUMMARY OF THE INVENTION

Therefore, it is an object of the present invention to solve the above problems, and other technical problems that have yet to be resolved.

Specifically, an object of the present invention is to provide a cathode active material for a secondary battery which ensures superior safety and can have a long-term service life at both room temperature and high temperature, even after repeated high-current charge and discharge.

Another object of the present invention is to provide a lithium secondary battery comprising a cathode containing the above-mentioned cathode active material.

DETAILED DESCRIPTION OF PREFERRED EMBODIMENTS

In accordance with an aspect of the present invention, the above and other objects can be accomplished by the provision of a cathode active material for a secondary battery, comprising a mixture of a lithium/manganese spinel oxide represented by Formula I below and a lithium/nickel/cobalt/manganese composite oxide represented by Formula II below, wherein at least one of two oxides has an average particle diameter of more than 15 μm:

$$Li_{1+x}Mn_2O_4 \qquad \text{[Formula I]}$$

wherein,
0≦x≦0.2.

$$Li_{1+y}Ni_bMn_cCo_{1-(b+c)}O_2 \qquad \text{[Formula II]}$$

wherein,
0≦y≦0.1;
0.2≦b≦0.7;
0.2≦c≦0.7; and
b+c<1.

In accordance with another aspect of the present invention, there is provided a lithium secondary battery comprising the above-mentioned cathode active material-containing cathode, an anode, a separator and an electrolyte.

In order to improve the life characteristics of the battery, the present invention uses an oxide having an average particle diameter of more than 15 μm as the cathode active material. This is because an increase in the particle size of the oxide leads to inhibition in decomposition of an electrolyte and reduction in dissolution of manganese into the electrolyte. However, the manufacturing process of the oxide suffers from limitations in increasing of the oxide particle size, and an excessively larger particle size of the oxide leads to deterioration of the battery efficiency versus the weight thereof. Therefore, the average particle diameter of the oxide is preferably in the range of 15 to 30 μm.

As a preferred example of the oxide particle size, mention may be made of a case where the lithium/manganese spinel oxide of Formula I has an average particle diameter of more than 15 μm, and a case where the lithium/manganese spinel oxide of Formula I and the lithium/nickel/cobalt/manganese composite oxide of Formula II have an average particle diameter of more than 15 μm, respectively. That is, when the average particle diameter of the lithium/manganese spinel oxide is more than 15 μm or the average particle diameter of both oxides is more than 15 μm, life characteristics of the battery are further improved. These facts will be illustrated and confirmed in the following Examples and Comparative Examples hereinafter.

As used herein, the average particle diameter of the oxide preferably refers to a particle diameter of the oxide when large numbers of particles gather into an aggregate. The cathode active materials, i.e., individual oxide units tend to aggregate depending upon set conditions of the manufacturing process, and the resulting aggregate per se exerts desirable characteristics of active materials. Therefore, the average particle diameter of the oxide preferably means a particle diameter of such an oxide aggregate.

The particle diameter of the oxide unit may vary depending upon processes for preparation of the oxides. Therefore, in a preferred embodiment, the oxide unit of the lithium/manganese spinel oxide may have a particle diameter of 0.2 to 10 μm, upon taking into consideration various characteristics of the cathode active material and morphology of the aggregate.

In addition, the particle diameter of the oxides has a close relationship with the surface area of the oxide. When the oxide unit has a surface area of 0.1 to 1.0 m$^2$/g, it is possible to exert superior characteristics of the active material.

The lithium/nickel/cobalt/manganese composite oxide is a lithium oxide which simultaneously contains nickel, manganese and cobalt elements, as shown in Formula II, and significantly improves, in combination with the lithium/manganese spinel oxide, the safety and life characteristics of the cathode active material according to the present invention. The lithium/nickel/cobalt/manganese composite oxide contains each of at least 0.2 M nickel and manganese, provided that it contains cobalt. Preferred examples of the lithium/nickel/cobalt/manganese composite oxide may include, but are not limited to, $Li_{1+z}N_{1/3}Co_{1/3}Mn_{1/3}O_2$ and $Li_{1+z}Ni_{0.4}Mn_{0.4}Co_{0.2}O_2$.

The mixing ratio of two composite oxides in the cathode active material of the present invention is preferably in the range of 90:10 to 10:90, more preferably in the range of 90:10 to 30:70 (w/w). If the content of the composite oxide (I) among two composite oxides is excessively low, the stability of the battery is lowered. Conversely, if the content of the composite oxide (II) is excessively low, it is undesirably difficult to achieve desired life characteristics. These facts will also be illustrated and confirmed in the following Examples and Comparative Examples hereinafter.

When the lithium/manganese spinel oxide of Formula I is a lithium/manganese spinel oxide of Formula III wherein a portion of manganese (Mn) is substituted with other metal elements, the life characteristics of the battery can be further improved.

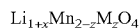
[Formula III]

wherein,

M is a metal having an oxidation number of 2 or 3;
$0 \leq x \leq 0.2$; and
$0 \leq z \leq 0.2$.

In the lithium/manganese spinel oxide of Formula III, manganese (Mn) is substituted with a metal (M) having an oxidation number of 2 or 3 within the predetermined range. Herein, the metal (M) may be preferably aluminum (Al), magnesium (Mg) or both of them.

Since the oxidation number of the substituent metal is smaller than that of manganese (Mn), an increasing amount of the substituted metal leads to a decrease in an average value of the oxidation number and a relative increase in the oxidation number of manganese (Mn), consequently resulting in inhibition of manganese (Mn) dissolution. That is, as the amount of the substituted metal (z) in the lithium/manganese spinel oxide of Formula III increases, life characteristics are further improved. However, since an increasing amount of the substituted metal (z) is also accompanied by a decrease of initial capacity, a maximum value of z is preferably less than 0.2, which is capable of maximizing improvements of the life characteristics and minimizing reduction of the initial capacity of the battery. More preferably, the value of z is in the range of 0.01 to 0.2.

Methods of preparing lithium metal composite oxides, such as lithium/manganese spinel oxides of Formula I, lithium/nickel/cobalt/manganese composite oxides of Formula II and lithium/manganese spinel oxides of Formula III wherein a portion of manganese is substituted with a certain metal, are well-known in the art and thus will not be described herein.

Hereinafter, fabrication of a cathode containing a cathode active material according to the present invention will be specifically illustrated.

First, the cathode active material of the present invention, and a binder and a conductive material in a content of 1 to 20% by weight relative to the active material are added to a dispersion solvent and the resulting dispersion is stirred to prepare an electrode paste. The paste is applied to a metal plate for a current collector which is then compressed and dried to fabricate a laminate electrode.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

As examples of the binder that may be utilized in the present invention, mention may be made of polytetrafluoroethylene (PTFE), polyvinylidene fluoride (PVdF), cellulose, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

Where appropriate, the filler may be optionally added as an ingredient to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

Representative examples of the dispersion solvent that can be used in the present invention may include isopropyl alcohol, N-methylpyrrolidone (NMP) and acetone.

Uniform application of the paste of electrode materials to a metal material may be carried out by conventional methods known in the art or appropriate novel methods, taking into consideration characteristics of materials to be used. For example, preferably the electrode paste is distributed onto the current collector and is then uniformly dispersed thereon using a doctor blade. Where appropriate, distribution and dispersion of the electrode paste may also be performed in a single step. Further, application of the electrode paste may be carried out by a method selected from die casting, comma coating, screen printing and the like. Alternatively, application of the electrode paste may be carried out by molding the paste on a separate substrate and then binding it to the current collector via pressing or lamination.

Drying of the paste applied over the metal plate is preferably carried out in a vacuum oven at 50 to 200° C. for 1 to 3 days.

Further, the present invention provides a lithium secondary battery comprising the cathode fabricated as above.

The lithium secondary battery of the present invention is comprised of an electrode assembly composed of the above-mentioned cathode and an anode, which are arranged opposite to each other with a separator therebetween, and a lithium salt-containing, non-aqueous electrolyte.

The anode is, for example, fabricated by applying an anode active material to an anode current collector, followed by drying. If desired, the anode may further optionally include other components such as conductive material, binder and filler, as described above.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesion to the anode active material. In addition, the anode current collector may take various forms including films, sheets, foils, nets, porous structures, foams and non-woven fabrics.

As examples of the anode materials utilizable in the present invention, mention may be made of carbon such as non-graphitizing carbon and graphite based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$, (Me: Mn, Fe, Pb, Ge; Me': Al, B, P, Si, Group I, Group II and Group III elements of the Periodic Table of the Elements, halogen atoms; $0 \leq x \leq 1$; $1 \leq y \leq 3$; and $1 \leq z \leq 8$); lithium metals; lithium alloys; silicon based alloys; tin based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics, or kraft papers made of an olefin polymer such as polypropylene and/or glass fibers or polyethylene, which have chemical resistance and hydrophobicity, are used. Typical examples of commercially available products for the separator may include Celgard series such as Celgard™ 2400 and 2300 (available from Hoechst Celanese Corp.), polypropylene separators (available from Ube Industries Ltd., or Pall RAI Co.) and polyethylene series (available from Tonen or Entek).

Where appropriate, a gel polymer electrolyte may be coated on the separator to increase the battery stability. Representative examples of the gel polymer may include polyethylene oxide, polyvinylidene fluoride and polyacrylonitrile.

When a solid electrolyte such as a polymer is employed as the electrolyte, the solid electrolyte may also serve as both the separator and electrolyte.

The lithium salt-containing non-aqueous electrolyte is composed of a non-aqueous electrolyte and lithium. As the non-aqueous electrolyte, a non-aqueous electrolytic solution, organic solid electrolyte and inorganic solid electrolyte may be utilized.

As examples of the non-aqueous electrolytic solution that can be used in the present invention, mention may be made of non-protic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy Franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following Examples. These examples are provided only for illustrating the present invention and should not be construed as limiting the scope and spirit of the present invention.

Example 1

A lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 17 μm were mixed in a weight ratio of 1:1 to thereby prepare a cathode active material. The cathode active material was mixed with 5% by weight of carbon black and 5% by weight of PVdF as a binder, and stirred with NMP as a solvent. The resulting mixture was coated on aluminum foil as a metal current collector which was then dried in a vacuum oven at 120° C. for more than 2 hours, thereby fabricating a cathode.

An electrode assembly was fabricated using the thus-fabricated cathode, an anode which was fabricated by coating mesocarbon microbeads (MCMBs) as artificial graphite on copper foil, and a porous separator made of polypropylene. The electrode assembly was placed in a pouch case to which electrode leads were then connected. Thereafter, as an electrolyte, a solution of ethylene carbonate (EC) and dimethyl carbonate (DMC) (1:1, v/v), in which 1M $LiPF_6$ salt was dissolved, was injected thereto, followed by sealing the case to assemble a lithium secondary battery.

The thus-fabricated lithium secondary battery was subjected to charge/discharge cycling in a voltage range of 3.0 to 4.2 V and life characteristics of the battery were measured. The results thus obtained are given in Table 1 below.

Example 2

A lithium secondary battery was assembled in the same manner as in Example 1, except that a cathode active material was prepared using a lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 9 μm. The thus-fabricated lithium secondary battery was subjected to charge/discharge cycling in a voltage range of 3.0 to 4.2 V and life characteristics of the battery were measured. The results thus obtained are given in Table 1 below.

Example 3

A lithium secondary battery was assembled in the same manner as in Example 1, except that a cathode active material was prepared using a lithium/manganese spinel oxide of $Li_{1+x}Mn_2O_4$ having an average particle size of 15 μm and a lithium/nickel/cobalt/manganese composite oxide of $Li_{1+z}Ni_{1/3}Co_{1/3}Mn_{1/3}O_2$ having an average particle size of 17 μm. The thus-fabricated lithium secondary battery was subjected to charge/discharge cycling in a voltage range of 3.0 to 4.2 V and life characteristics of the battery were measured. The results are given in Table 1 below.

Example 4

A lithium secondary battery was assembled in the same manner as in Example 1, except that a cathode active material was prepared using a lithium/manganese spinel oxide of $Li_{1+x}Mn_2O_4$ having an average particle size of 15 μm and a lithium/nickel/cobalt/manganese composite oxide of $Li_{1+z}Ni_{1/3}Co_{1/3}Mn_{1/3}O_2$ having an average particle size of 9 μm. The thus-fabricated lithium secondary battery was subjected to charge/discharge cycling in a voltage range of 3.0 to 4.2 V and life characteristics of the battery were measured. The results are given in Table 1 below.

Example 5

A lithium secondary battery was assembled in the same manner as in Example 1, except that a cathode active material was prepared using a lithium/manganese spinel oxide of $Li_{1+x}Mn_2O_4$ having an average particle size of 10 μm and a lithium/nickel/cobalt/manganese composite oxide of $Li_{1+z}Ni_{1/3}Co_{1/3}Mn_{1/3}O_2$ having an average particle size of 17 μm. The thus-fabricated lithium secondary battery was subjected to charge/discharge cycling in a voltage range of 3.0 to 4.2 V and life characteristics of the battery were measured. The results are given in Table 1 below.

Comparative Example 1

A lithium secondary battery was assembled in the same manner as in Example 1, except that a cathode active material was prepared using a lithium/manganese spinel oxide of $Li_{1+x}Mn_2O_4$ having an average particle size of 10 μm and a lithium/nickel/cobalt/manganese composite oxide of $Li_{1+z}Ni_{1/3}Co_{1/3}Mn_{1/3}O_2$ having an average particle size of 9 μm. The thus-fabricated lithium secondary battery was subjected to charge/discharge cycling in a voltage range of 3.0 to 4.2 V and life characteristics of the battery were measured. The results are given in Table 1 below.

TABLE 1

| | Average particle size of lithium/manganese spinel (μm) | Average particle size of lithium/nickel/cobalt/manganese composite oxide (μm) | Life characteristics (Capacity at 300 cycles relative to initial capacity, %) |
|---|---|---|---|
| Example 1 | 19 | 17 | 87 |
| Example 2 | 19 | 9 | 84 |
| Example 3 | 15 | 17 | 81 |
| Example 4 | 15 | 9 | 72 |
| Example 5 | 10 | 17 | 77 |
| Comp. Example 1 | 10 | 9 | 60 |

As can be seen from Table 1, increases in the average particle size of the lithium/manganese spinel oxide and lithium/nickel/cobalt/manganese composite oxide resulted in improvements of life characteristics. When the average particle size of at least one of above two oxides was more than 15 μm, more than 70% of battery performance relative to initial capacity was exerted even after 300 cycles. When the average particle size of both oxides was less than 15 μm, life characteristics of the battery are significantly deteriorated with at most 60% of the initial capacity being exerted under the same conditions. Particularly, it was confirmed that when the average particle size of both oxides was more than 15 μm, life characteristics of the battery were further improved.

Example 6

A lithium secondary battery was assembled in the same manner as in Example 1, except that a cathode active material was prepared by mixing a lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 9 μm in a weight ratio of 90:10. The thus-fabricated lithium secondary battery was subjected to charge/discharge cycling in a voltage range of 3.0 to 4.2 V and life characteristics of the battery were measured. The results are given in Table 2 below.

Example 7

A lithium secondary battery was assembled in the same manner as in Example 1, except that a cathode active material was prepared by mixing a lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 9 μm in a weight ratio of 70:30. The thus-fabricated lithium secondary battery was subjected to charge/discharge cycling in a voltage range of 3.0 to 4.2 V and life characteristics of the battery were measured. The results are given in Table 2 below.

Example 8

A lithium secondary battery was assembled in the same manner as in Example 1, except that a cathode active material was prepared by mixing a lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 9 μm in a weight ratio of 50:50 (1:1). The thus-fabricated lithium secondary battery was subjected to charge/discharge cycling in a voltage range of 3.0 to 4.2 V and life characteristics of the battery were measured. The results are given in Table 2 below.

Example 9

A lithium secondary battery was assembled in the same manner as in Example 1, except that a cathode active material was prepared by mixing a lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 9 μm in a weight ratio of 30:70. The thus-fabricated lithium secondary battery was subjected to charge/discharge cycling in a voltage range of 3.0 to 4.2 V and life characteristics of the battery were measured. The results are given in Table 2 below.

Example 10

A lithium secondary battery was assembled in the same manner as in Example 1, except that a cathode active material was prepared by mixing a lithium/manganese spinel oxide of $Li_{1+x}Mn_2O_4$ having an average particle size of 19 μm and a lithium/nickel/cobalt/manganese composite oxide of $Li_{1+z}Ni_{1/3}Co_{1/3}Mn_{1/3}O_2$ having an average particle size of 9 μm in a weight ratio of 10:90. The thus-fabricated lithium secondary battery was subjected to charge/discharge cycling in a voltage range of 3.0 to 4.2 V and life characteristics of the battery were measured. The results are given in Table 2 below.

Comparative Example 2

A lithium secondary battery was assembled in the same manner as in Example 1, except that a cathode active material was prepared using only a lithium/manganese spinel oxide of $Li_{1+x}Mn_2O_4$ having an average particle size of 19 μm. The thus-fabricated lithium secondary battery was subjected to charge/discharge cycling in a voltage range of 3.0 to 4.2 V and life characteristics of the battery were measured. The results are given in Table 2 below.

Comparative Example 3

A lithium secondary battery was assembled in the same manner as in Example 1, except that a cathode active material was prepared using only a lithium/nickel/cobalt/manganese composite oxide of $Li_{1+z}Ni_{1/3}Co_{1/3}Mn_{1/3}O_2$ having an average particle size of 9 μm. The thus-fabricated lithium secondary battery was subjected to charge/discharge cycling in a voltage range of 3.0 to 4.2 V and life characteristics of the battery were measured. The results are given in Table 2 below.

TABLE 2

|  | Weight ratio of 19 μm - size lithium/manganese spinel | Weight ratio of 9 μm - size lithium/nickel/cobalt/manganese composite oxide | Life characteristics (Capacity at 300 cycles relative to initial capacity, %) |
|---|---|---|---|
| Example 6 | 90 | 10 | 78 |
| Example 7 | 70 | 30 | 85 |
| Example 8 | 50 | 50 | 84 |
| Example 9 | 30 | 70 | 81 |
| Example 10 | 10 | 90 | 80 |
| Comp. Example 2 | 100 | 0 | 58 |
| Comp. Example 3 | 0 | 100 | 75 |

As can be seen from Table 2, life characteristics of the battery began to improve when more than 10% lithium/nickel/cobalt/manganese composite oxide having an average particle size of 9 μm was added to the lithium/manganese spinel oxide having an average particle size of 19 μm, and addition of 30% lithium/nickel/cobalt/manganese composite oxide reached the maximum value of life characteristics. However, an excessively high content of the lithium/nickel/cobalt/manganese composite oxide may result in relatively low safety of the battery and therefore it is preferred to use the lithium/nickel/cobalt/manganese composite oxide in an amount of less than 90%. In addition, it can be seen that batteries of Examples 6 to 10 exhibit superior life characteristics, as compared to batteries of Comparative Examples 2 and 3 which contain a single kind of an oxide as an active material.

Example 11

A lithium secondary battery was assembled in the same manner as in Example 1, except that a cathode active material was prepared using a substituted lithium/manganese spinel oxide of $Li_{1+x}Mn_{1.9}Al_{0.1}O_4$, instead of using $Li_{1+x}Mn_2O_4$.

The thus-fabricated lithium secondary battery was subjected to charge/discharge cycling in a voltage range of 3.0 to 4.2 V and life characteristics of the battery were measured. The results are given in Table 3 below.

Example 12

A lithium secondary battery was assembled in the same manner as in Example 1, except that a cathode active material was prepared using a substituted lithium/manganese spinel oxide of $Li_{1+x}Mn_{1.8}Al_{0.2}O_4$, instead of using $Li_{1+x}Mn_2O_4$.

The thus-fabricated lithium secondary battery was subjected to charge/discharge cycling in a voltage range of 3.0 to 4.2 V and life characteristics of the battery were measured. The results are given in Table 3 below.

Example 13

A lithium secondary battery was assembled in the same manner as in Example 1, except that a cathode active material was prepared using a substituted lithium/manganese spinel oxide of $Li_{1+x}Mn_{1.7}Al_{0.3}O_4$, instead of using $Li_{1+x}Mn_2O_4$.

The thus-fabricated lithium secondary battery was subjected to charge/discharge cycling in a voltage range of 3.0 to 4.2 V and life characteristics of the battery were measured. The results are given in Table 3 below.

Example 14

A lithium secondary battery was assembled in the same manner as in Example 1, except that a cathode active material was prepared using a substituted lithium/manganese spinel oxide of $Li_{1+x}Mn_{1.9}Mg_{0.1}O_4$, instead of using $Li_{1+x}Mn_2O_4$.

The thus-fabricated lithium secondary battery was subjected to charge/discharge cycling in a voltage range of 3.0 to 4.2 V and life characteristics of the battery were measured. The results are given in Table 3 below.

Example 15

A lithium secondary battery was assembled in the same manner as in Example 1, except that a cathode active material was prepared using a substituted lithium/manganese spinel oxide of $Li_{1+x}Mn_{1.8}Mg_{0.2}O_4$, instead of using $Li_{1+x}Mn_2O_4$.

The thus-fabricated lithium secondary battery was subjected to charge/discharge cycling in a voltage range of 3.0 to 4.2 V and life characteristics of the battery were measured. The results are given in Table 3 below.

Example 16

A lithium secondary battery was assembled in the same manner as in Example 1, except that a cathode active material was prepared using a substituted lithium/manganese spinel oxide of $Li_{1+x}Mn_{1.7}Mg_{0.3}O_4$, instead of using $Li_{1+x}Mn_2O_4$.

The thus-fabricated lithium secondary battery was subjected to charge/discharge cycling in a voltage range of 3.0 to 4.2 V and life characteristics of the battery were measured. The results are given in Table 3 below.

TABLE 3

| | Substituent metal ions | Substitution amount of metal ions (z) | Life characteristics (Capacity at 300 cycles relative to initial capacity, %) |
|---|---|---|---|
| Example 11 | Al | 0.1 | 88 |
| Example 12 | Al | 0.2 | 93 |
| Example 13 | Al | 0.3 | 94 |
| Example 14 | Mg | 0.1 | 89 |
| Example 15 | Mg | 0.2 | 91 |
| Example 16 | Mg | 0.3 | 92 |
| Example 1 | — | — | 87 |

As can be seen from Table 3, in the composite oxide mixtures of the cathode active materials, substitution of a manganese (Mn) site of the lithium/manganese spinel oxide with aluminum (Al) or magnesium (Mg) has led to further improvements in life characteristics of the battery. In addition, the higher substitution amounts (z-value) of metal ions have led to further improvements in life characteristics. However, it was confirmed that when the substitution amount, i.e., the z value, exceeds 0.2, the initial capacity of the battery is decreased.

INDUSTRIAL APPLICABILITY

As apparent from the above description, a lithium secondary battery using, as a cathode active material, a mixture of lithium/manganese spinel oxide and lithium/nickel/cobalt/manganese composite oxide according to the present invention wherein at least one of two oxides has an average particle diameter of more than 15 μm can secure safety of the battery and improve a service life thereof, even under high current, short period charge/discharge cycle conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cathode active material for a lithium secondary battery, consisting of a mixture of a lithium/manganese spinel oxide represented by Formula I and a lithium/nickel/cobalt/manganese composite oxide represented by Formula II, wherein the lithium/manganese spinel oxide of Formula I and the lithium/nickel/cobalt/manganese composite oxide of Formula II have an average particle diameter of 15 μm to 30 μm, respectively:

$$Li_{1+x}Mn_{2-z}M_zO_4 \quad (I)$$

$$Li_{1+y}Ni_bMn_cCo_{1-(b+c)}O_2 \quad (II)$$

wherein,
M is a metal having an oxidation number of 2 or 3;
$0 \leq x \leq 0.2$;
$0 \leq y \leq 0.1$;
$0 < z \leq 0.2$;
$0.2 \leq b \leq 0.7$;
$0.2 \leq c \leq 0.7$; and
b+c<1 and wherein the mixture of the lithium/manganese spinel oxide of Formula I and the lithium/nickel/cobalt/manganese composite oxide of Formula II is in the ratio of 30:70 to 70:30 by weight.

2. The cathode active material according to claim 1, wherein the lithium/nickel/cobalt/manganese composite oxide of Formula II is $Li_{1+y}Ni_{1/3}Co_{1/3}Mn_{1/3}O_2$.

3. The cathode active material according to claim 1, wherein the lithium/nickel/cobalt/manganese composite oxide of Formula II $Li_{1+y}Ni_{0.4}Mn_{0.4}Co_{0.2}O_2$.

4. The cathode active material according to claim 1, wherein the oxide is an aggregate of large numbers of oxide units.

5. The cathode active material according to claim 4, wherein the oxide unit of the lithium/manganese spinel oxide of Formula I has a particle diameter of 0.2 to 10 μm.

6. The cathode active material according to claim 4, wherein the oxide unit has a surface area of 0.1 to 1.0 m²/g.

7. The cathode active material according to claim 1, wherein the mixing ratio of the lithium/manganese spinel oxide:lithium/nickel/cobalt/manganese composite oxide is in the range of 10:90 to 90:10 (w/w).

8. The cathode active material according to claim 1, wherein M in Formula III is aluminum (Al), magnesium (Mg) or both of them.

9. The cathode active material according to claim 1, wherein the value of z is in the range of 0.01 to 0.2.

10. A lithium secondary battery comprising a cathode active material of claim 1.

* * * * *